(12) United States Patent
Gruhlke et al.

(10) Patent No.: US 11,724,444 B2
(45) Date of Patent: Aug. 15, 2023

(54) CROSS-LINKED POLYMER FILLED POLYMER FOR 3D PRINTED ITEMS

(71) Applicant: SIGNIFY HOLDING B.V., Eindhoven (NL)

(72) Inventors: Stefan Willi Julius Gruhlke, Eindhoven (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 485 days.

(21) Appl. No.: 16/982,552

(22) PCT Filed: Mar. 14, 2019

(86) PCT No.: PCT/EP2019/056407
§ 371 (c)(1),
(2) Date: Sep. 19, 2020

(87) PCT Pub. No.: WO2019/185361
PCT Pub. Date: Oct. 3, 2019

(65) Prior Publication Data
US 2021/0023773 A1   Jan. 28, 2021

(30) Foreign Application Priority Data
Mar. 26, 2018 (EP) ..................... 18163859

(51) Int. Cl.
*B29C 64/118* (2017.01)
*B33Y 10/00* (2015.01)
(Continued)

(52) U.S. Cl.
CPC ............ *B29C 64/118* (2017.08); *B29C 70/58* (2013.01); *B33Y 10/00* (2014.12); *B33Y 70/00* (2014.12);
(Continued)

(58) Field of Classification Search
None
See application file for complete search history.

(56) References Cited

U.S. PATENT DOCUMENTS

| 2008/0038544 A1 | 2/2008 | Kitaike et al. |
| 2012/0013045 A1 | 1/2012 | Sugimura et al. |

(Continued)

FOREIGN PATENT DOCUMENTS

| CN | 104031304 A | 9/2014 |
| CN | 105331115 A | 2/2016 |

(Continued)

*Primary Examiner* — Mohammad M Ameen

(57) ABSTRACT

Method for manufacturing a 3D item (1) by means of fused deposition modeling, the method comprising layer-wise depositing (during a printing stage) 3D printable material (201), to provide the 3D item (1) comprising 3D printed material (202), wherein the 3D printable material (201) comprises a continuous phase of a thermoplastic polymeric material and particles (410) embedded therein, wherein the particles (410) comprise a crosslinked polymeric material and wherein the particles (410) have a first dimension (LI) selected from the range of 0.2-100 micron. The 3D printable material (202) and the particles (410) comprise a light transmissive material, and the light transmissive material of the particles (410) has an index of refraction selected from the range of 1.2-1.8

14 Claims, 6 Drawing Sheets

(51) Int. Cl.
    *B33Y 80/00*     (2015.01)
    *B33Y 70/10*     (2020.01)
    *B29C 70/58*     (2006.01)
    *C08K 7/16*     (2006.01)
    *C08L 101/00*     (2006.01)
    *B33Y 70/00*     (2020.01)
    *B29K 101/12*     (2006.01)
    *B29K 105/00*     (2006.01)
    *B29K 105/16*     (2006.01)
    *B29K 105/24*     (2006.01)

(52) U.S. Cl.
    CPC ............... *B33Y 70/10* (2020.01); *B33Y 80/00* (2014.12); *C08K 7/16* (2013.01); *C08L 101/00* (2013.01); *B29K 2101/12* (2013.01); *B29K 2105/0005* (2013.01); *B29K 2105/16* (2013.01); *B29K 2105/24* (2013.01); *B29K 2105/251* (2013.01); *C08K 2201/003* (2013.01); *C08K 2201/004* (2013.01); *C08L 2207/04* (2013.01); *C08L 2312/00* (2013.01)

(56) References Cited

U.S. PATENT DOCUMENTS

| | | | |
|---|---|---|---|
| 2016/0084476 | A1 | 3/2016 | Koole et al. |
| 2017/0107396 | A1* | 4/2017 | Gaggar ................ C09J 5/06 |
| 2017/0321056 | A1* | 11/2017 | Matano ................ G03F 7/0047 |

FOREIGN PATENT DOCUMENTS

| | | |
|---|---|---|
| CN | 105555867 A | 5/2016 |
| CN | 106496737 A | 3/2017 |
| CN | 106633363 A | 5/2017 |
| CN | 107109091 A | 8/2017 |
| CN | 107428073 A | 12/2017 |
| CN | 107739512 A | 2/2018 |
| CN | 107746501 A | 3/2018 |
| JP | S6449622 A | 2/1989 |
| JP | H02502898 A | 9/1990 |
| JP | 2017502862 A | 1/2017 |
| JP | 2017514725 A | 6/2017 |
| JP | 2017217758 A | 12/2017 |
| WO | 2016046216 A1 | 3/2016 |
| WO | 2016083181 A1 | 6/2016 |
| WO | 2017040893 A1 | 3/2017 |
| WO | 2019002120 A1 | 1/2019 |

\* cited by examiner

CROSS-LINKED POLYMER FILLED POLYMER FOR 3D PRINTED ITEMS

CROSS-REFERENCE TO PRIOR APPLICATIONS

This application is the U.S. National Phase application under 35 U.S.C. §371 of International Application No. PCT/EP2019/056407, filed on Mar. 14, 2019, which claims the benefit of European Patent Application No. 18163859.4, filed on Mar. 26, 2018. These applications are hereby incorporated by reference herein.

FIELD OF THE INVENTION

The invention relates to a method for manufacturing a 3D (printed) item. The invention also relates to the 3D (printed) item obtainable with such method. Further, the invention relates to a lamp or luminaire including such 3D (printed) item. Yet further, the invention also relates to 3D printable material.

BACKGROUND OF THE INVENTION

The use of a thermoplastic polymer comprising a particulate filler for preparing 3D articles is known in the art.

WO-2017/040893, for instance, describes a powder composition, wherein the powder composition comprises a plurality of thermoplastic particles characterized by a bimodal particle size distribution, wherein the powder composition may further comprise a particulate filler, antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent, fragrance, fiber, or a combination comprising at least one of the foregoing, preferably a colorant or a metal particulate. This document further describes a method of preparing a three-dimensional article, the method comprising powder bed fusing the powder composition to form a three-dimensional article.

US-2017/107396 discloses a method of making a thermoplastic article. The method comprises the steps of depositing a multitude of layers of thermoplastic extruded material in a preset pattern and fusing the multitude of layers of extruded material to form the article. The thermoplastic extruded material comprises a discontinuous elastomeric phase dispersed in a rigid thermoplastic phase. The rigid thermoplastic phase comprises structural units derived from (C1-C12)alkyl(meth)acrylate. The discontinuous elastomeric phase may be a particulate, moderately cross-linked conjugated butadiene or C4-6 alkyl acrylate rubber.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast and can be used for printing complicated object.

FDM printers are relatively fast, low cost and can be used for printing complicated 3D objects. Such printers are used in printing various shapes using various polymers. The technique is also being further developed in the production of LED luminaires and lighting solutions.

In processes such as injection molding surface appearance and degree of mat appearance is determined by the surface structure of the matrix. However in the case of FDM printing polymer layers extruded during the printing get deposited on top of each other can have a very glossy appearance. This glossy appearance of transparent polymers such as PC, PMMA containing additives such as color (opaque and transparent) are not always appreciated. In order to remove gloss and induce mat surface appearance inorganic fillers can be used. However it was found that when inorganic fillers are used especially with polymers with relatively high $T_g$ (higher than 130° C.) adhesion between the layers can be quite weak. Nevertheless, it is desirable to include particulate material in the 3D printable material, also for other purposes such as for adjusting optical properties and reducing the thermal expansion coefficient of the system, etc.

Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

Hence, in a first aspect the invention provides a method for manufacturing a 3D item by means of fused deposition modeling, the method comprising layer-wise depositing (during a printing stage) a 3D printable material with particles embedded therein, to provide the 3D item comprising 3D printed material with the particles embedded in the 3D printed material, wherein the 3D printable material comprises a continuous phase of a thermoplastic polymeric material, wherein the particles comprise a crosslinked polymeric material, wherein at least part of the total number of the particles have a first dimension (especially a (largest) length or a diameter) selected from the range of 0.2-100 μm. The 3D printable material and the particles comprise a light transmissive material. The light transmissive material of the particles has an index of refraction selected from the range of 1.2-1.8.

It was surprisingly found that when cross-linked polymer particles are used as additives the layers show strong adhesion and delamination problems can be avoided or reduced. Further, with the method as indicated above, it may be possible to create surfaces that have a mat appearance, which may be useful for different applications.

The printable material comprises two phases. The printable material comprises a phase of a thermoplastic material (see also below), which phase is an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The printable material further comprises particulate material, i.e. particles embedded in the printable polymeric material, which particles form a substantially discontinuous phase. The amount of particles in the total mixture is especially not larger than 60 vol. %, relative to the total volume of the printable material (including the particles) especially in applications for reducing thermal expansion coefficient. For optical and surface related effect amount of particles in the total mixture is equal to or less than 20 vol. %, such as up to 10 vol. %, relative to the total volume of the printable material (including the particles). Hence, the 3D printable material especially refers to a continuous phase of essentially thermoplastic material, wherein the particles of cross-linked polymeric material, and optionally other particles, are embedded. Likewise, the 3D printed material especially refers to a continuous phase of essentially thermoplastic material, wherein the particles of cross-linked polymeric material, and optionally other particles, are embedded.

Especially, the 3D printable material comprises in the range of 1-50 vol. %, especially 1-20 vol. %, such as even more especially 1-5 vol. % of the particles (which are herein further defined also a particles of cross-linked polymeric material), relative to the total volume of the 3D printable material (including particles). In addition to these particles, the 3D printable material may thus comprise further particulate material (as indicated above), in total to an amount of 60 vol. %, more especially up to in total 50 vol. %, like at maximum equal to or less than 20 vol. %, like equal to or less than 10 vol. % relative to the total volume of the printable material (including the particles of cross-linked polymeric material and optional further particles).

Herein below, when it is referred to particles, it is referred to the particles of chemically cross-linked polymeric material, unless indicated otherwise or clear from the context. Hence, the printable material (including particles) is herein also indicated as "printable material". However, the term "3D printable material" especially refers to the continuous phase of thermoplastic (essentially (chemically) non-crosslinked) material; when embodiments of the particles are described, it is especially referred to "the particles". Hence, the thermoplastic material (that provides the continuous phase) may be 3D printable, especially FDM printable per se, whereas the particles as such may essentially not be 3D printable, but may only be printable as they embedded in the thermoplastic (essentially (chemically) non-crosslinked) 3D printable material.

The particles may comprise a single material or the particles may comprise different types of materials. The particles may have a unimodal particle size distribution or a polymodal size distribution. Especially, at least part of the total number of particles have a first dimension (L1) selected from—in specific embodiments—the range of 0.2-100 µm. The particles may be spherical or may have another shape, like flake-like, rod like, etc. The particles may also have irregular shapes.

Especially, the first dimension refers to a longest dimension (or to a diameter). Therefore, especially the first dimension is length (i.e. a longest length) or a diameter. Herein, the terms "particle size" and "first dimension" and similar terms may refer to sizes and dimensions that may be derived from e.g. SEM measurements or from laser scattering measurements, and when the particles are larger, even from light microscopic measurements.

In case of a spherical particle, the longest dimension and shortest dimension are equal, and are the diameter. In case of a bar like element (rectangular cuboid), the longest dimension may be the length and the shortest dimension may be the height (assuming the width is larger than the height). In the case of an essentially cylindrical particle, one of the length and the diameter may be the longest dimension.

For irregular shaped particles, but also for regular shaped articles, for the sake of easiness, the smallest rectangular cuboid (rectangular parallelepiped) enclosing the (irregular shaped) particle may be used to define the length, width and height. Hence, the term "first dimension" especially refers to the length of the smallest rectangular cuboid (rectangular parallelepiped) enclosing the irregular shaped particle.

When the particle is essentially spherical the longest dimension, the shortest dimension, and the diameter are essentially the same. Hence, the term "longest dimension" and equivalent terms especially refer to the longest dimension (or "length") of the smallest rectangular cuboid (rectangular parallelepiped) enclosing the particle. Therefore, the first dimension (L1) of a particle may be (defined as) the length of a smallest rectangular cuboid enclosing the particle, especially having a length in a range of 0.2 to 100 µm.

Would at least part of the particles be spherical, then such particles have a diameter, which is essentially the same as the first dimension (or length, or longest dimension. Hence, in embodiments at least part of the particles are spherical and wherein the first dimension (L1) (of such particles) is a diameter.

As indicated above, especially each particle, irrespective of being regular or irregular shaped, has a smallest bounding box in the form of a rectangular cuboid. Each rectangular cuboid has a width, a height, and a length, the latter being the most extended dimension of the rectangular cuboid. The "first dimension" especially refers to this most extended dimension of the rectangular cuboid. Hence, the invention provides amongst others a method for 3D printing a 3D item, wherein the method comprises layer-wise depositing 3D printable material to provide the 3D item comprising 3D printed material, wherein the 3D printable material and the 3D printed material comprise a plurality of particles embedded therein, wherein the particles comprise a crosslinked polymeric material, and wherein the particles have a smallest bounding box in the form of a rectangular cuboid, the rectangular cuboid especially having a length in a range of 0.2 to 100 µm.

In specific embodiments, at least 50 vol. % of the particles, such as especially all particles, have the first dimension selected from the range of 0.2-100 µm. Yet even more especially, all the particles have the first dimension selected from the range of 0.2-100 µm. In yet further embodiments, at least 50 vol. % of the particles, such as have the first dimension selected from the range of 1-100 µm. Best results are obtained in this range, or even more in the range of 2-50 µm.

Especially, in embodiments the first dimension is a diameter, or in embodiments the first dimension is the longest length.

With (laser) light scattering, especially a volume averaged diameter may be determined (of particulate material). In embodiments, the herein indicated first dimension may especially refer to a $D_{3,2}$ value, such as e.g. obtainable via laser diffraction. Hence, in embodiments the particles have a $D_{3,2}$ value selected from the range of 0.2-100 µm, especially selected from the range of 1-100 µm, such as from the range of 2-50 µm.

The polymeric printable material, i.e. the continuous phase, is especially not cross-linked, but comprises thermoplastic material. In specific embodiments, the 3D printable material may comprise one or more of acrylonitrile butadiene styrene, polystyrene, polycarbonate, modified PC with higher Tg (e.g. Apec from Covestro), polyethylene terephthalate, polymethylmethacrylate, polyethylene, polypropylene, and copolymers of two or more of these. The particles especially comprise chemically cross-linked material, such as cross-linked molecules by polymerization of groups such as (metha)acrylate, vinyl, epoxy, phenol, especially leading to chemically cross-linked polymers. Here, it is referred to the essentially continuous phase wherein other material, especially the particles, may be dispersed.

In embodiments, the particles comprise one or more of cross-linked natural rubber, cross-linked silicone rubber, a cross-linked epoxy, a cross-linked phenolic resins, optionally a cross-linked polyurethane, cross-linked polyolefin (such as cross-linked polyethylene and/or cross-linked polypropylene), a cross-linked polyester, a cross-linked polybutadiene rubber, cross-linked (metha)acrylate, a cross-linked styrene polymers and copolymers of thereof.

In specific embodiments, the particles comprise the same polymeric material as the polymer of (the continuous phase of) the printable material, but then cross-linked. Hence, in embodiments the 3D printable material comprises a continuous phase of thermoplastic polymeric material and the particles comprise the same material, but then cross-linked. Thus, the particles comprise essentially the same polymeric material as the continues phase, but the polymeric material of the continuous phase of the 3D printable material is essentially not cross-linked whereas the polymeric material of the particles is cross-linked.

For optical applications, but also for non-optical applications, it may be desirable that the 3D printable material is light transmissive. Likewise, it may be desirable when also the particles comprise a light transmissive material. With the present combination of materials, a mat (side) surface may be provided. Hence, the ribbed side face of the 3D item may have a mat appearance. This may especially be obtained, when the index of refraction of the particles is about the same as the index of refraction of the 3D printable polymeric material. Especially, a ratio of refractive indices may be in the range 0.7-1.4, such as in the range of 0.8-1.25. Hence, in specific embodiments, the 3D printable material and the particles comprise light transmissive material. Especially, the particles comprise light transmissive material having an index of refraction selected from the range of 1.2-1.8.

As the particles may have a positive effect on the binding of layers to each other. The particles may also be used in combination with other particles, that may have other purposes, and which may have a negative effect on the binding of layers. Hence, the particles may also be used for compensating detrimental effect of other particles on the binding of layers. For instance, inorganic particles for luminescent purposes, or for magnetic purposes, or for other purposes, may be applied, which may have a negative effect on the binding. By also using the particles as defined herein, binding may still be sufficient, even though other particles that have a negative effect on the binding are available in the 3D printed material.

As indicated above, the method comprises layer-wise depositing (during a printing stage) 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed. Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

As indicated above, the invention thus provides a method comprising providing a filament of 3D printable material and printing (during a printing stage) said 3D printable material on a substrate, to provide said 3D item.

Materials that may especially qualify as 3D printable materials may be selected from the group consisting of metals, glasses, thermoplastic polymers, silicones, etc.

In the method according to the invention, the 3D printable material comprises a (thermoplastic) polymer, such as a polymer selected from the group consisting of ABS (acrylonitrile butadiene styrene), Nylon (or polyamide), Acetate (or cellulose), PLA (poly lactic acid), terephthalate (such as PET polyethylene terephthalate), acrylic (polymethylacrylate, Perspex, polymethylmethacrylate, PMMA), polypropylene (or polypropene), polystyrene (PS), low density polyethylene (LDPE), High density polythene (HDPE)), PVC (polyvinyl chloride) Polychloroethene, a polyamide, other polyesters such as Polycarbonate (PC), sulfide containing polymers such as polysulfone, thermoelastic elastomers such as polyurethanes and copolymers of PET with polyethyleene glycol. Specific examples are also indicated above.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Layer by layer printable material is deposited, by which the 3D printed item is generated (during the printing stage). The 3D printed item may show a characteristic ribbed structures (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one more post processing actions may be executed after removing the printed item from the receiver item. Post processing may include e.g. one or more of polishing, coating, adding a functional component, etc. Post-processing may include smoothening the ribbed structures, which may lead to an essentially smooth surface.

The invention provides in a further aspect the 3D printable material per se, that may be used in the herein described method. Hence, in an aspect the invention provides a fused deposition modelling 3D printable material with particles embedded therein, wherein the 3D printable material comprises a continuous phase of a thermoplastic polymeric material, wherein the particles comprise a cross-linked polymeric material and wherein at least part of the total number of the particles especially have a first dimension (especially a (largest) length or a diameter) selected from the range of 0.2-100 µm. The 3D printable material and the particles comprise a light transmissive material, and the light transmissive material of the particles has an index of refraction selected from the range of 1.2-1.8. Though the particles are embedded in the material, this does not exclude that a subset of the particles may partially protrude from the 3D printable material. This may also apply to the 3D printed material. Hence, the 3D printed material may have roughness as a result of particles partially extending from the (polymeric) 3D printed material (even though a smoothening of the surface of the 3D printed item may lead to an essentially smooth surface). This may contribute to a mat appearance of the product.

Further, the invention relates to a software product that can be used to execute the method described herein. Instead of the term "software product" also the term "computer program product" may be applied.

The herein described method provides 3D printed items. Hence, the invention also provides in a further aspect a 3D printed item obtainable with the herein described method. Especially, the invention provides a 3D item comprising 3D printed material with particles embedded therein, wherein the 3D printed material comprises a continuous phase of a thermoplastic polymeric material, wherein the particles comprise a crosslinked polymeric material, and wherein at least part of the total number of the particles especially have a first dimension (especially a (largest) length or a diameter) selected from the range of 0.2-100 µm. The 3D printed material and the particles comprise a light transmissive material, and the light transmissive material of the particles has an index of refraction selected from the range of 1.2-1.8. The particles are embedded in the 3D printed material. However, a subset of the total number of particles may also be at the surface of the 3D printed material, and partially extend thereof. Hence, at least a part of the total number of particles is fully embedded in the printed material; a part of the total number of particles may be partly embedded in the printed material and may extend from the surface of the 3D printed material.

Some specific embodiments in relation to the 3D printed item have already been elucidated below when discussing the method. Below, some specific embodiments in relation to the 3D printed item are discussed in more detail.

As indicated above, in embodiments at least 50 vol. % of the particles may have the first dimension selected from the range of 0.2-100 µm. In further embodiments, at least 50 vol. % of the particles may have the first dimension selected from the range of 1-100 µm. Hence, at least part of the total number of the particles especially have the first dimension.

As can be derived from the above, especially the 3D printed material comprises in the range of 1-50 vol. %, especially 1-20 vol. %, such as even more especially 1-5 vol. % of the particles (which are herein further defined also a particles of cross-linked polymeric material), relative to the total volume of the 3D printed material. In addition to these particles, the 3D printed material may thus comprise further particulate material (as indicated above), in total to an amount of 60 vol. %, more especially up to in total 50 vol. %, like at maximum equal to or less than 20 vol. %, like equal to or less than 10 vol. % relative to the total volume of the printable material (including the particles of crosslinked polymeric material and optional further particles). Hence, in embodiments the 3D printed material comprises in the range of up to 20 vol. %, such as up to 10 vol. %, like in the range at least 1 vol. % of the particles, like especially in the range of 1-5 vol. % of the particles, relative to the total volume of the 3D printed material.

Further, in specific embodiments the 3D printed material may comprise one or more of acrylonitrile butadiene styrene, polystyrene, polycarbonate, modified PC with higher Tg (e.g. Apec from Covestro), polyethylene terephthalate, polymethylmethacrylate, polyethylene, polypropylene, and copolymers of two or more of these, and/or the particles may comprises on or more of one or more of cross-linked natural rubber, cross-linked silicone rubber, a cross-linked epoxy, a cross-linked phenolic resins, optionally a cross-linked polyurethane, cross-linked polyolefin (such as cross-linked polyethylene and/or cross-linked polypropylene), a cross-linked polyester, a cross-linked polybutadiene rubber, cross-linked (metha)acrylate, a cross-linked styrene polymers and copolymers of thereof. In specific embodiments, the particles comprise the same polymeric material as the polymer of (the continuous phase of) the printed material, but then cross-linked. Hence, in embodiments the 3D printed material comprises a continuous phase of thermoplastic polymeric material and wherein the particles comprise the same material, but then cross-linked. Thus, the particles comprise essentially the same polymeric material as the continues phase, but the polymeric material of the continuous phase is essentially not cross-linked whereas the polymeric material of the particles is cross-linked.

The (with the herein described method) obtained 3D printed item may be functional per se. The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light source (like a LED), etc. The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively, or additionally, the functional component may comprise a thermal component (e.g. configured to cool or to heat an electrical component). Hence, the functional component may be configured to generate heat or to scavenge heat, etc.

In yet a further aspect, the invention provides a luminaire or a lamp comprising the 3D item, such as e.g. a spot light or for a spot light. For instance, the item may be used as lamp shade, as housing for a lamp or as luminaire housing, such as a spot light etc.

Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, wherein the fused deposition modeling 3D printer is configured to provide said 3D printable material to a substrate, and build layer by layer the 3D item. The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, and build layer by layer the 3D item.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
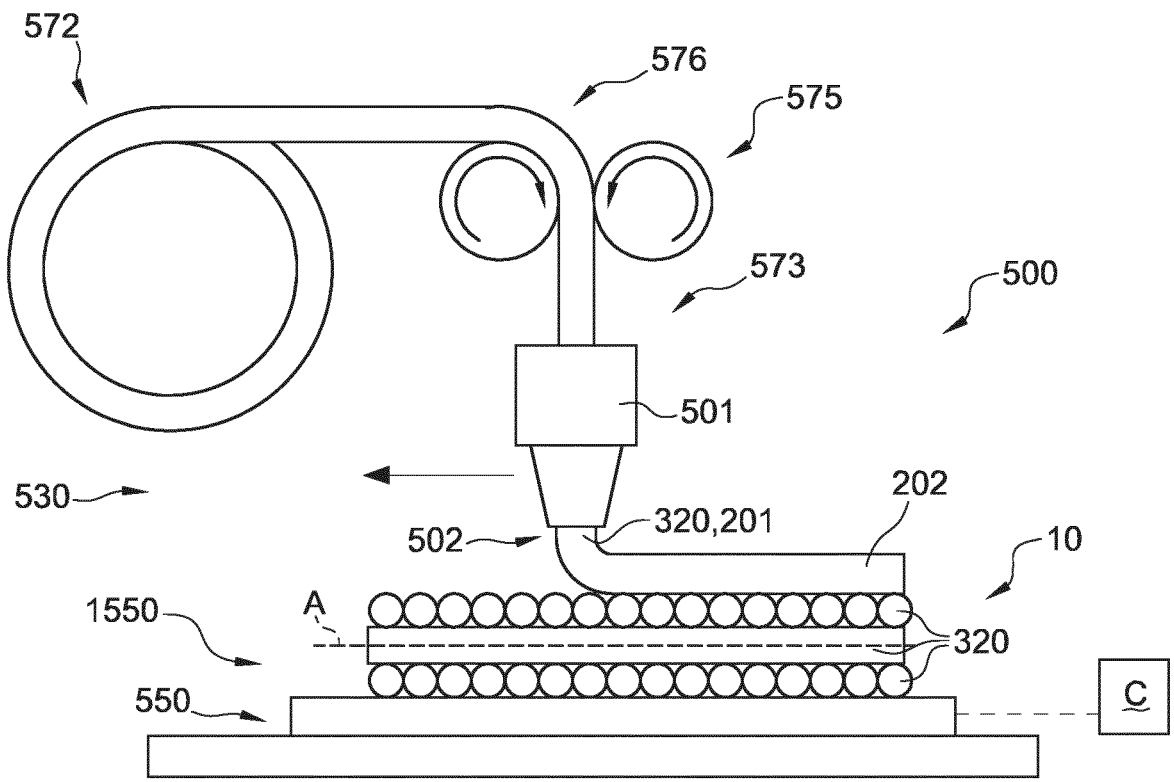
FIGS. 1a-1b schematically depict some general aspects of the 3D printer and/or printing process.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 1 by layer-wise depositing on a receiver item 550, which may in embodiments at least temporarily be cooled, a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire. The 3D printer 500 transforms this in a filament or fiber 320 on the receiver item or on already deposited printed material. In general, the diameter of the filament downstream of the nozzle is reduced relative to the diameter of the filament upstream of the printer head. Hence, the printer nozzle is sometimes (also) indicated as extruder nozzle. Arranging filament by filament and filament on filament, a 3D item 1 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550.

The control system C may include a heater which is able to heat the receiver item 550 to at least a temperature of 50° C., but especially up to a range of about 350° C., such as at least 200° C.

Alternatively or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Figure 1B:
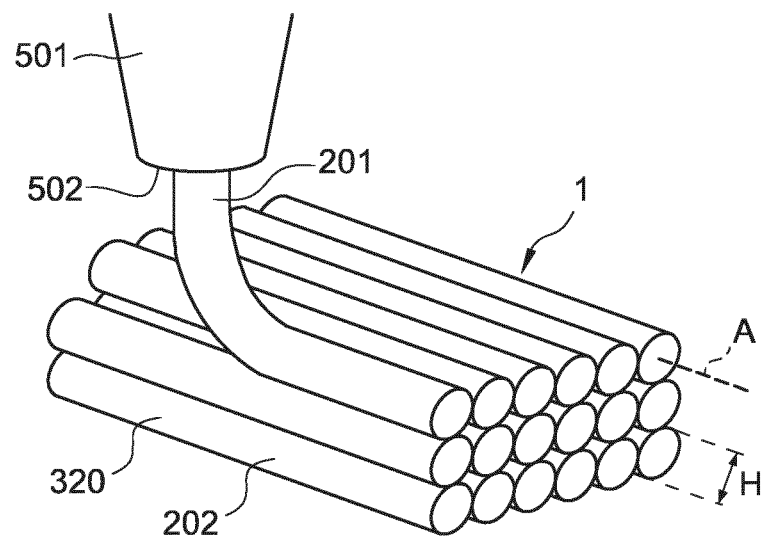

FIG. 1b schematically depicts in 3D in more detail the printing of the 3D item 1 under construction. Here, in this schematic drawing the ends of the filaments 320 in a single plane are not interconnected, though in reality this may in embodiments be the case.

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 320 comprising 3D printable material 201 to the first printer head 501, and optionally (c) a receiver item 550. In FIGS. 1a-1b, the first or second printable material or the first or second printed material are indicated with the general indications printable material 201 and printed material 202.

Figure 2A:
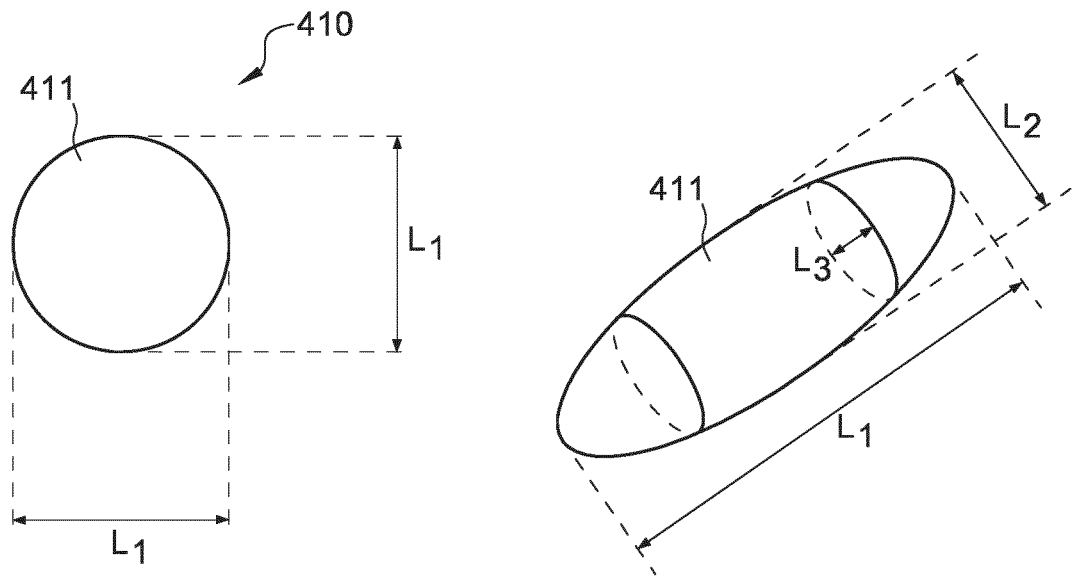
FIG. 2a-2f schematically depict some aspects of embodiments of particles.

FIG. 2a schematically depicts embodiments of particles 410. The particles comprise a material 411, or may essentially consist of such material 411, which is especially cross-linked polymeric material. It may be the same polymeric material as of the 3D printable material, but then cross-linked. Cross-links may e.g. be obtained by curing curable polymers.

The particles 410 have a first dimension L1. In the left example, L1 is essentially the diameter of the essentially spherical particle. On the right side a particle is depicted which has non spherical shape, such as an elongated particle 410. Here, by way of example L1 is the longest length. L2 and L3 can be seen as width and height. Of course, the particles may comprise a combination of differently shaped particles.

Figure 2B:
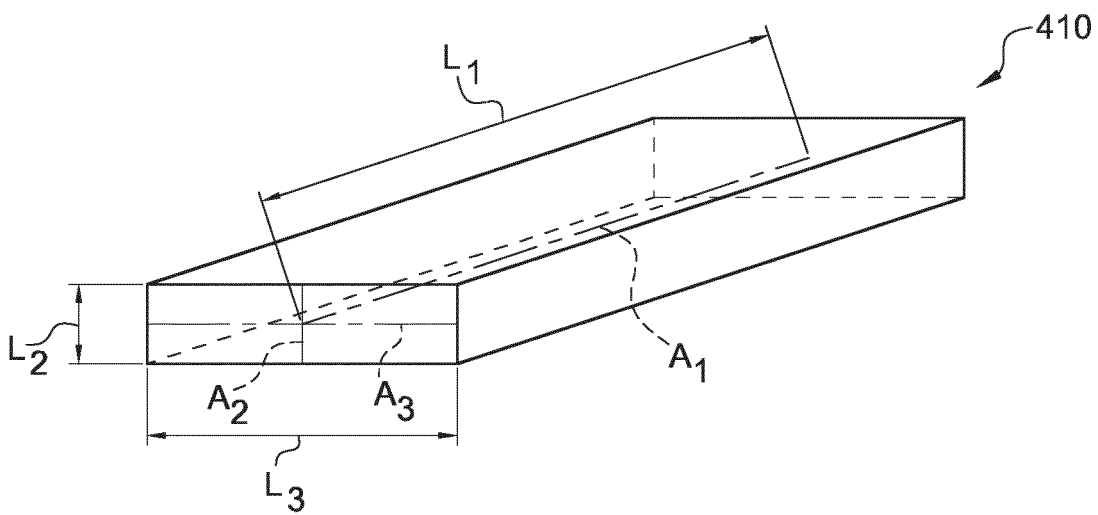

FIGS. 2b-2f schematically depict some aspects of the particles 410. Some particles 410 have a longest dimension A1 having a longest dimension length L1 and a shortest dimension A2 having a shortest dimension length L2. As can be seen from the drawings, the longest dimension length L1 and the shortest dimension length L2 have a first aspect ratio larger than 1. FIG. 2b schematically depicts a particle 410 in 3D, with the particle 410 having a length, height and width, with the particle (or flake) essentially having an elongated shape. Hence, the particle may have a further (minor or main) axis, herein indicated as further dimension A3. Essentially, the particles 410 are elongated thin particles, i.e. L2<L1, especially L2<<L1, and L2<L3, especially L2<<L3. L1 may e.g. be selected from the range of 1-500 µm; likewise L3 may be. L2 may e.g. be selected from the range of 0.1 µm-10 µm. Also L3 may e.g. be selected from the range of 0.1 µm-10 µm. However, L2 and/or L3 may also be longer, such as up to 5 mm, such as up to 1 mm, like up to 100 µm.

Figure 2C:
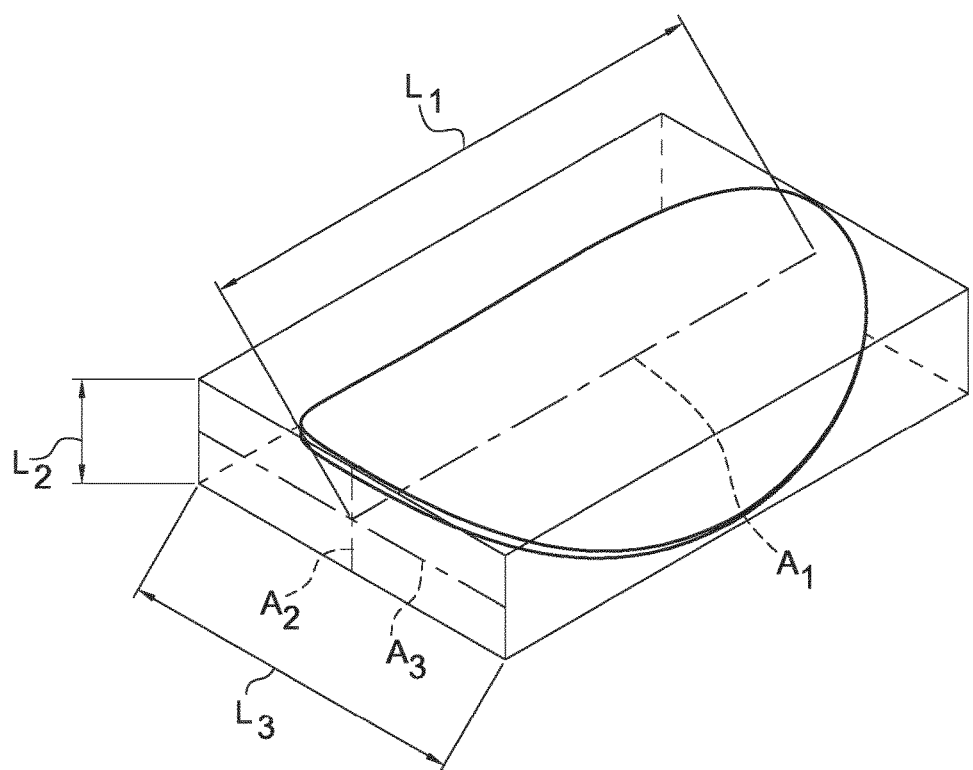

FIG. 2c schematically depicts a particle that has a less regular shape such as pieces of broken glass, with a virtual smallest rectangular parallelepiped enclosing the particle.

Note that the notations L1, L2, and L3, and A1, A2 and A3 are only used to indicate the axes and their lengths, and that the numbers are only used to distinguish the axis. Further, note that the particles are not essentially oval or rectangular parallelepiped. The particles may have any shape with at least a longest dimension substantially longer than a shortest dimension or minor axes, and which may essentially be flat. Especially, particles are used that are relatively regularly formed, i.e. the remaining volume of the fictive smallest rectangular parallelepiped enclosing the particle is small, such as less than 50%, like less than 25%, of the total volume.

Figure 2D:
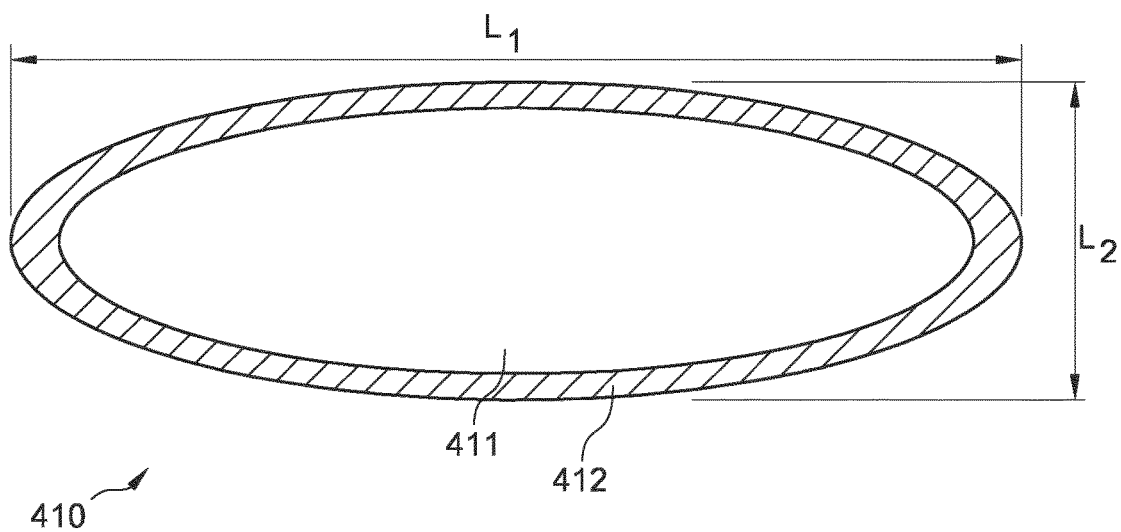

FIG. 2d schematically depicts in cross-sectional view a particle 410 including a coating 412. The coating may comprise light reflective material. For instance, the coating may comprise a (white) metal oxide. In other embodiments, the coating may essentially consist of a metal, such as an Ag coating. In other embodiments the coatings may only be on one or both of the large surfaces and not on the thin side surfaces of the particles.

Figure 2E:
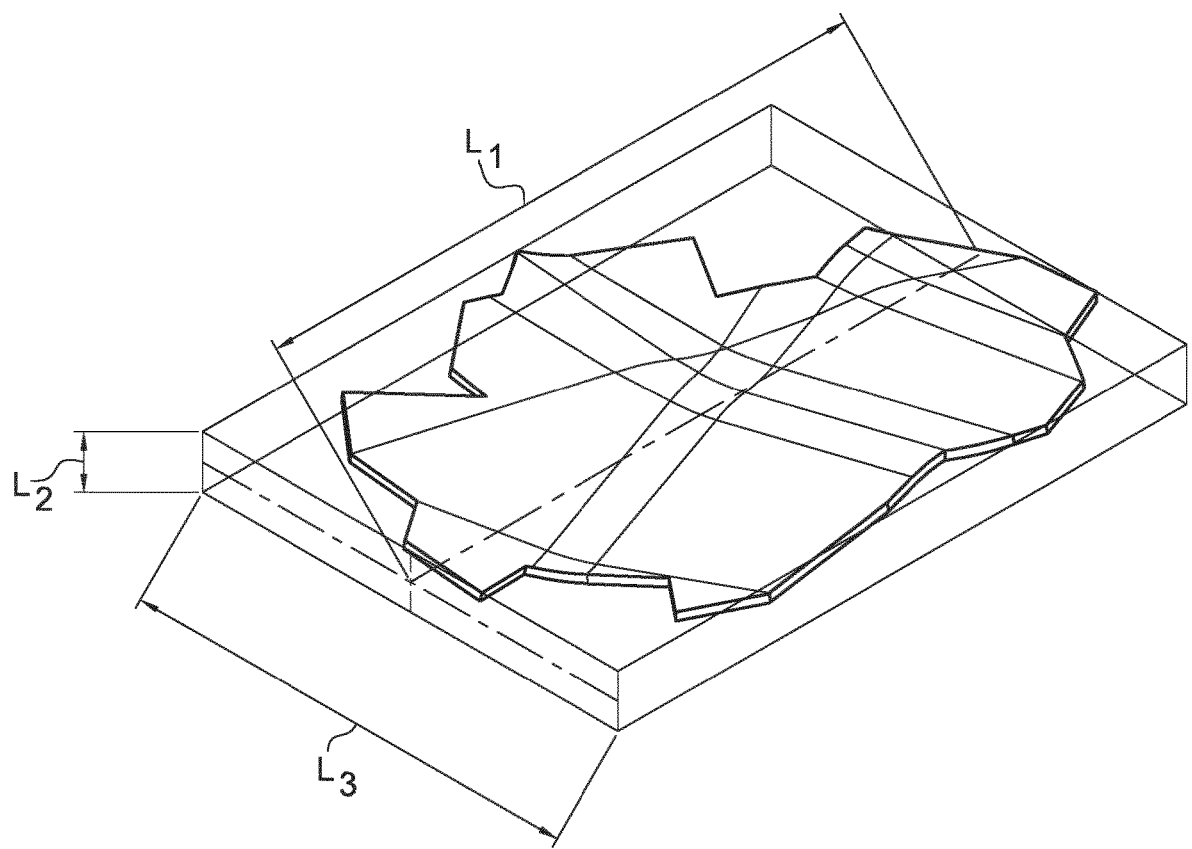

FIG. 2e schematically depicts a relatively irregularly shaped particle. The particulate material that is used may comprise e.g. small broken glass pieces. Hence, the particulate material that is embedded in the 3D printable material or is embedded in the 3D printed material may include a broad distribution of particles sizes. A rectangular parallelepiped can be used to define the (orthogonal) dimensions with lengths L1, L2 and L3.

Figure 2F:
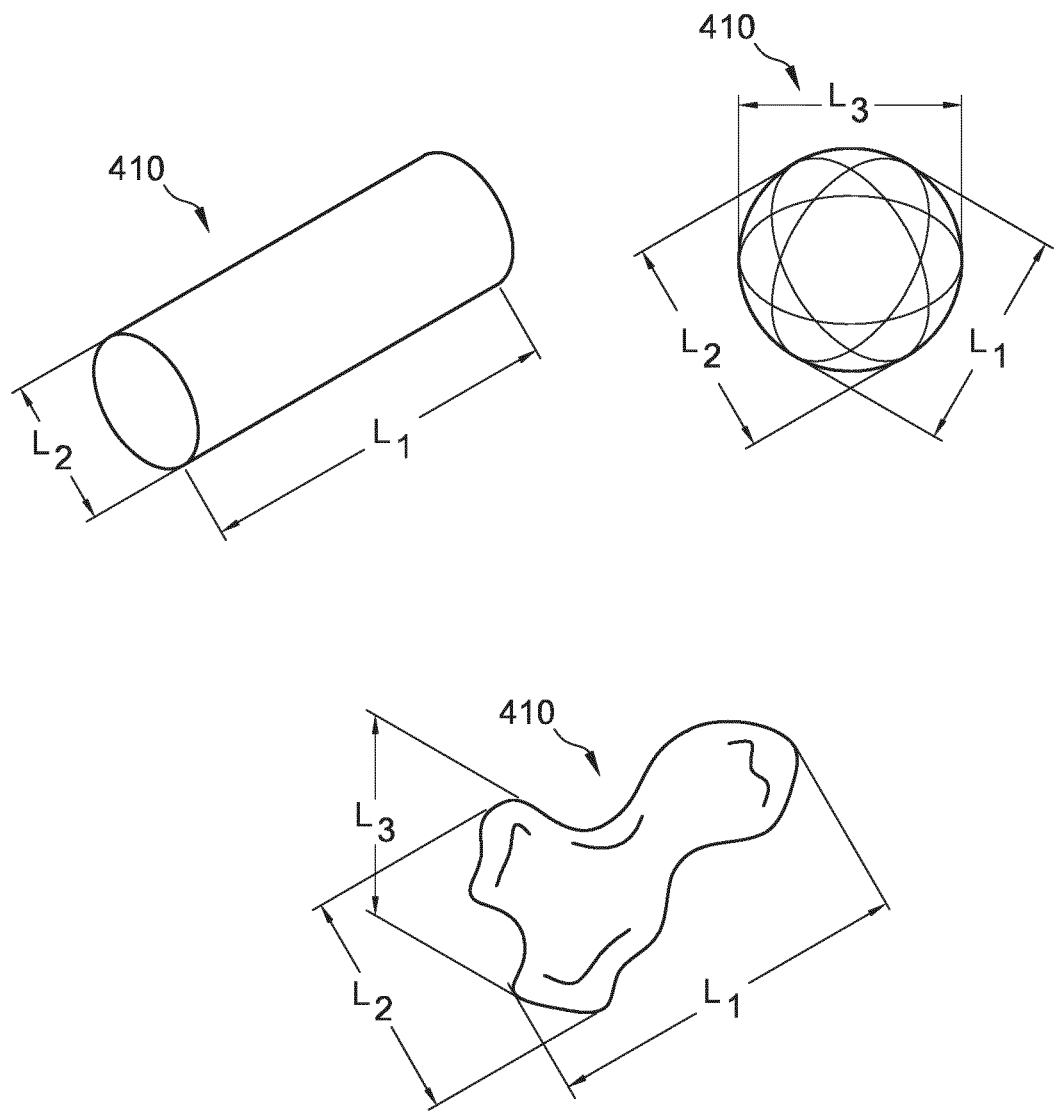

Especially, particles with an irregular 3-D shape, a cylindrical shape (such as a short fiber), a spherical shape, are particularly relevant. FIG. 2f schematically depicts cylindrical, spherical, and irregularly shaped particles.

As shown in FIGS. 2b-2f the terms "first dimension" or "longest dimension" especially refer to the length L1 of the smallest rectangular cuboid (rectangular parallelepiped) enclosing the irregular shaped particle. When the particle is essentially spherical the longest dimension L1, the shortest dimension L2, and the diameter are essentially the same.

Figures 3A, 3B:
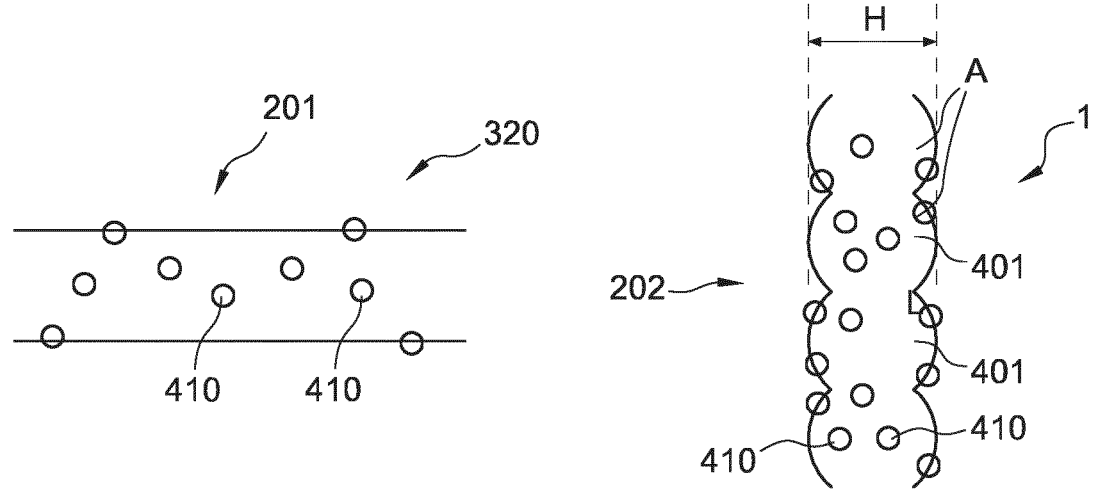
FIGS. 3a-3b schematically depict some further aspects of the invention.

FIG. 3a schematically depicts a filament 320, such as when escaping from a printer nozzle (not depicted), which comprises 3D printable material 201. The 3D printable material comprise thermoplastic material 401 with particles 410 embedded therein.

FIG. 3b schematically depicts a 3D item 1, showing the ribbed structures (originating from the deposited filaments), having heights H. This height may also be indicated as width.

Figure 4:
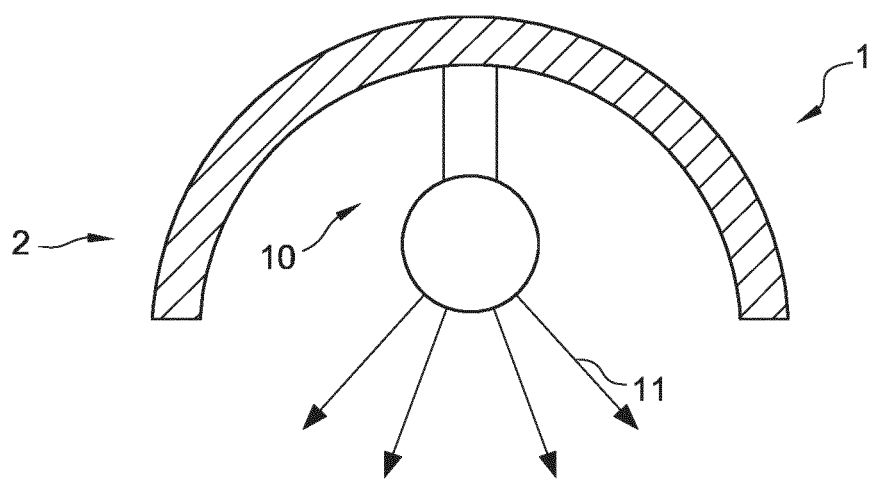
FIG. 4 schematically depicts a lamp or luminaire.

FIG. 4 schematically depicts an embodiment of a lamp or luminaire, indicated with reference 1, which comprises a light source 10 for generating light 11. The lamp may comprise a housing or shade or other element, which may comprise or be the 3D printed item 2. The possible transmissivity of the material may provide additional optical effects and appearance (in the off state of the lamp or luminaire) may appear mat.

Examples and comparative examples were produced. Pure polycarbonate (PC) and PC with a black dye, 3D printed items appeared to have a good adhesion, but no essential mat appearance. However, PC containing 5% inorganic glass fibers with a diameter of 10 µm and length of 30

μm appeared to have a relative bad adhesion but appeared to have a mat appearance. Also PC containing 5 vol. % glass spheres with a diameter of about 0.2 mm appeared to have a bad adhesion but appeared to have a mat appearance. However, PC containing 5 vol. % cross-linked natural rubber particles with a size of 70 μm appeared to have a good adhesion and a mat appearance. Also PC containing 5 vol. % cross-linked silicone rubber particles with a size of 50 μm appeared to have a good adhesion. A mat appearance PC containing 5-20 vol. % $TiO_x$ (with especially x about 2) nano particles appeared to have a moderate to good adhesion but has a reflective and relatively shiny appearance.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention also provides a control system that may control the apparatus or device or system, or that may execute the herein described method or process. Yet further, the invention also provides a computer program product, when running on a computer which is functionally coupled to or comprised by the apparatus or device or system, controls one or more controllable elements of such apparatus or device or system.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for manufacturing a 3D item by means of fused deposition modeling, the method comprising layer-wise depositing a 3D printable material with particles embedded therein,
    wherein the 3D printable material comprises a continuous phase of a thermoplastic polymeric material,
    wherein the particles comprise a crosslinked polymeric material,
    wherein at least part of the total number of the particles have a first dimension (L1) selected from the range of 0.2-100 μm, the first dimension (L1) being a length or a diameter,
    wherein the 3D printable material and the particles comprise a light transmissive material, and
    wherein the light transmissive material of the particles has an index of refraction selected from the range of 1.2-1.8.

2. The method according to claim 1, wherein at least 50 vol. % of the particles have the first dimension (L1) selected from the range of 0.2-100 μm, wherein the first dimension (L1) of a particle is the length of a smallest rectangular cuboid enclosing the particle.

3. The method according to claim 1, wherein at least 50 vol. % of the particles have the first dimension (L1) selected from the range of 1-100 μm.

4. The method according to claim 1, wherein at least part of the particles are spherical and wherein the first dimension (L1) is a diameter.

5. The method according to claim 1, wherein the 3D printable material comprises in the range 1-20 vol. % of the particles, relative to the total volume of the 3D printable material.

6. The method according to claim 1, wherein the 3D printable material comprises one or more of acrylonitrile butadiene styrene, polystyrene, polycarbonate, polyethylene terephthalate, polyethylene, polypropylene, polymethylmethacrylate, and copolymers of two or more of these.

7. The method according to claim 1, wherein the particles comprises one or more of a cross-linked natural rubber, a cross-linked silicone rubber, a cross-linked epoxy, a cross-linked polyester, a cross-linked polyolefin, a cross-linked poly butadiene rubber, a phenolic-cross-linked resin, a cross-linked polymethylmethacrylate, a cross-linked polystyrene, and copolymers of two or more of these.

8. A 3D item comprising 3D printed material with particles embedded therein, wherein the 3D printed material comprises a continuous phase of a thermoplastic polymeric material, wherein the particles comprise a crosslinked polymeric material, wherein at least part of the total number of the particles have a first dimension (L1) selected from the range of 0.2-100 µm, the first dimension (L1) being a length or a diameter, wherein the 3D printed material and the particles comprise a light transmissive material, and wherein the light transmissive material of the particles has an index of refraction selected from the range of 1.2-1.8.

9. The 3D item according to claim 8, wherein at least 50 vol. % of the particles have the first dimension (L1) selected from the range of 0.2-100 µm.

10. The 3D item according to claim 8, wherein at least 50 vol. % of the particles have the first dimension (L1) selected from the range of 1-100 µm, wherein the first dimension (L1) is a diameter, and wherein the 3D printed material comprises in the range of 1-20 vol. % of the particles, relative to the total volume of the 3D printed material.

11. The 3D item according to claim 8, wherein the 3D printed material comprises one or more of acrylonitrile butadiene styrene, polystyrene, polycarbonate, polyethylenetelepthalate, polymethylmethacrylate, and copolymers of two or more of these, wherein the particles comprises one or more of a cross-linked natural rubber, a cross-linked silicone rubber, a cross-linked epoxy, a cross-linked polyester, a cross-linked polyolefin, a cross-linked poly butadiene rubber, a phenolic-cross-linked resin, a cross-linked polymethylmethacrylate, a cross-linked polystyrene, and copolymers of two or more thereof, and wherein and wherein the 3D printed material comprises in the range of 1-5 vol. % of the particles, relative to the total volume of the 3D printed material.

12. The 3D item according to claim 8, wherein the particles comprise the same thermoplastic polymeric material as the continuous phase of the 3D printed material, but then cross-linked.

13. A fused deposition modelling 3D printable material with particles embedded therein, wherein the 3D printable material comprises a continuous phase of a thermoplastic polymeric material, wherein the particles comprise a cross-linked polymeric material, wherein at least part of the total number of the particles have a first dimension (L1) selected from the range of 0.2-100 µm, the first dimension (L1) being a length or a diameter, wherein the 3D printable material and the particles comprise a light transmissive material, and wherein the light transmissive material of the particles has an index of refraction selected from the range of 1.2-1.8.

14. A luminaire or a lamp comprising the 3D item according to claim 8.

* * * * *